US011243995B2

(12) United States Patent
Zhiwen

(10) Patent No.: US 11,243,995 B2
(45) Date of Patent: Feb. 8, 2022

(54) METHOD FOR ATOMICALLY TRACKING AND STORING VIDEO SEGMENTS IN MULTI-SEGMENT AUDIO-VIDEO COMPOSITIONS

(71) Applicant: Lomotif Private Limited

(72) Inventor: Paul Yang Zhiwen, Singapore (SG)

(73) Assignee: Lomotif Private Limited, Singapore (SG)

( * ) Notice: Subject to any disclaimer, the term of this patent is extended or adjusted under 35 U.S.C. 154(b) by 0 days.

(21) Appl. No.: 17/189,104

(22) Filed: Mar. 1, 2021

(65) Prior Publication Data

US 2021/0271701 A1 Sep. 2, 2021

Related U.S. Application Data

(60) Provisional application No. 63/148,342, filed on Feb. 11, 2021, provisional application No. 62/983,175, filed on Feb. 28, 2020.

(51) Int. Cl.
*G06F 16/435* (2019.01)
*G06F 16/438* (2019.01)
(Continued)

(52) U.S. Cl.
CPC .......... *G06F 16/435* (2019.01); *G06F 16/438* (2019.01); *G06F 16/45* (2019.01); *G06K 9/00718* (2013.01)

(58) Field of Classification Search
CPC ....... G06F 16/435; G06F 16/45; G06F 16/438
(Continued)

(56) References Cited

U.S. PATENT DOCUMENTS

2010/0191689 A1  7/2010  Cortes et al.
2011/0208722 A1* 8/2011  Hannuksela .......... G06F 16/489
                                                  707/723
(Continued)

FOREIGN PATENT DOCUMENTS

KR   1020170060189 A   5/2017

OTHER PUBLICATIONS

International Search Report and Written Opinion for International Patent Application No. PCT/IB2021/000175, dated Aug. 12, 2021, 10 pages.

*Primary Examiner* — Kimberly L Wilson
(74) *Attorney, Agent, or Firm* — Run8 Patent Group, LLC; Alexander R. Flake; Peter Miller

(57) ABSTRACT

A method includes accessing an audiovisual composition comprising a target video segment and a source video segment. The method also includes, in response to presence of the target video segment and the source video segment in the audiovisual composition: accessing a first keyword associated with the source video segment; and calculating a first relevance score for the first keyword relative to the target video segment based on a temporal position of the source video segment in the audiovisual composition and a temporal position of the target video segment in the audiovisual composition; accessing a textual query comprising the first keyword. The method additionally includes: generating a first query result based on the textual query, the first query result comprising the target video segment based on the first relevance score; and at a native composition application, rendering a representation of the first query result.

20 Claims, 5 Drawing Sheets

(51) Int. Cl.
*G06F 16/45* (2019.01)
*G06K 9/00* (2006.01)

(58) Field of Classification Search
USPC .......................................................... 707/769
See application file for complete search history.

(56) References Cited

U.S. PATENT DOCUMENTS

| | | | |
|---|---|---|---|
| 2014/0366052 A1* | 12/2014 | Ives | H04N 21/23418 |
| | | | 725/19 |
| 2018/0041807 A1* | 2/2018 | Shen | H04N 21/4828 |
| 2018/0349391 A1 | 12/2018 | Chechik et al. | |
| 2020/0012862 A1 | 1/2020 | Mitra et al. | |
| 2020/0035234 A1 | 1/2020 | Aarabi | |
| 2020/0296362 A1* | 9/2020 | Chadwick | G06K 9/4628 |
| 2020/0336802 A1* | 10/2020 | Russell | H04N 21/26603 |
| 2021/0136448 A1* | 5/2021 | Ramirez | G06K 9/00302 |
| 2021/0151038 A1* | 5/2021 | Manjunath | G10L 15/1815 |

* cited by examiner

“the system,” shown in FIG. 3) interfacing with a native
METHOD FOR ATOMICALLY TRACKING AND STORING VIDEO SEGMENTS IN MULTI-SEGMENT AUDIO-VIDEO COMPOSITIONS

CROSS-REFERENCE TO RELATED APPLICATIONS

This Application claims priority to U.S. Provisional Application No. 62/983,175, filed on Feb. 28, 2020, and to U.S. Provisional Application No. 63/148,342, filed on Feb. 11, 2021, both of which are incorporated in their entireties by this reference.

This Application is related to U.S. Pat. No. 10,299,016, filed on Jun. 17, 2016, which is incorporated in its entirety by this reference.

TECHNICAL FIELD

This invention relates generally to the field of composite video storage and more specifically to a new and useful method for atomically tracking and storing video segments in the field of composite video storage.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
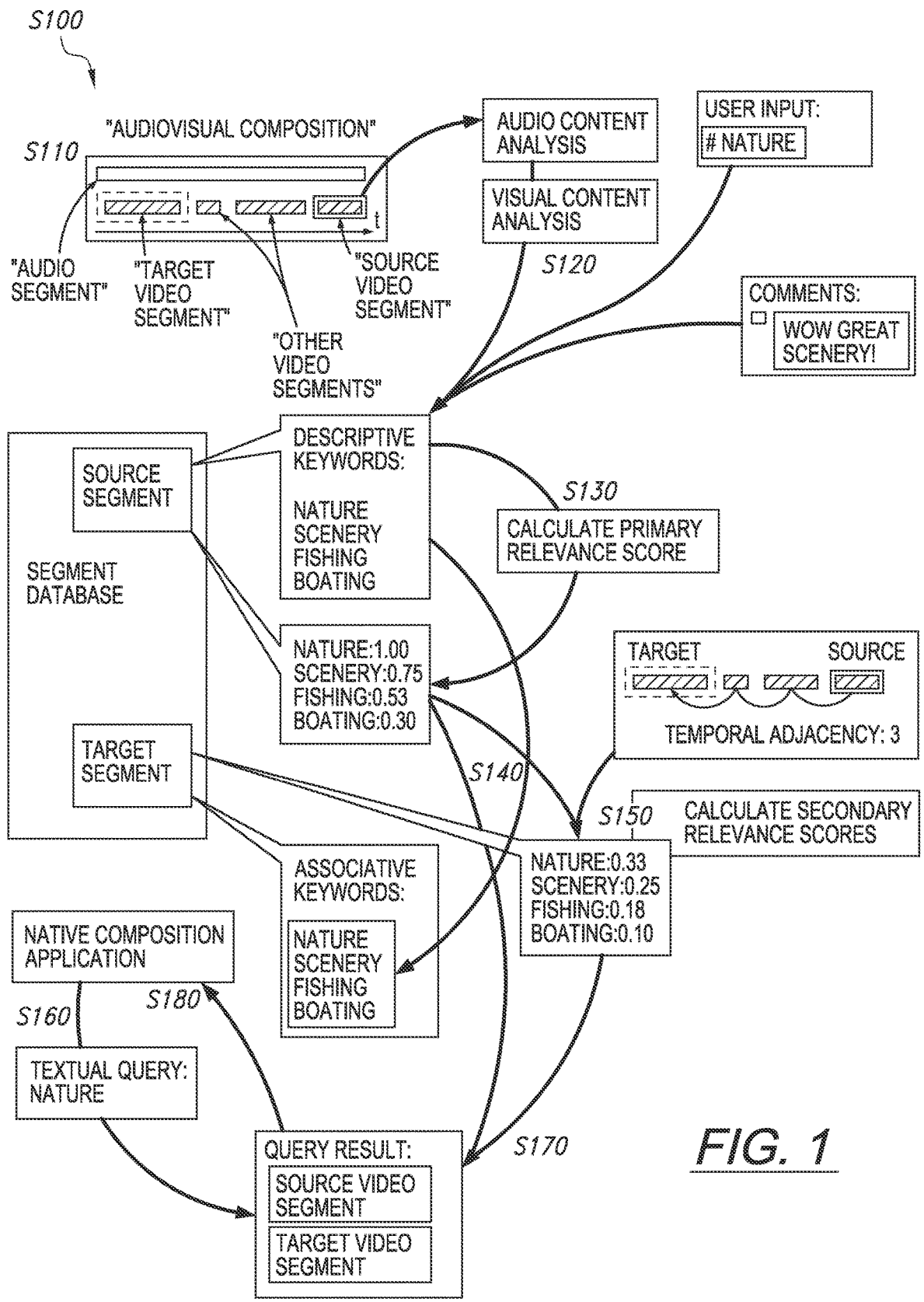
FIG. 1 is a flowchart representation of a method.

As shown in FIG. 1, a method S100 includes: accessing an audiovisual composition including a target video segment and a source video segment in Block S110; identifying a first descriptive keyword for the source video segment based on content associated with the source video segment in Block S120; and calculating a primary relevance score for the first descriptive keyword relative to the source video segment in Block S130. The method S100 also includes, in response to presence of the target video segment and the source video segment in the audiovisual composition: identifying the first descriptive keyword for the source video segment as a first associative keyword for the target video segment in Block S140; and calculating a secondary relevance score for the first associative keyword relative to the target video segment based on a temporal position of the source video segment in the audiovisual composition, a temporal position of the target video segment in the audiovisual composition, and the primary relevance score for the first descriptive keyword relative to the source video segment in Block S150. The method S100 further includes: accessing a textual query including the first associative keyword in Block S160; generating a first query result based on the textual query, the first query result comprising the source video segment based on the primary relevance score and the target video segment based on the secondary relevance score in Block S170; and at a native composition application, rendering a representation of the first query result in Block S180.

Figure 2:
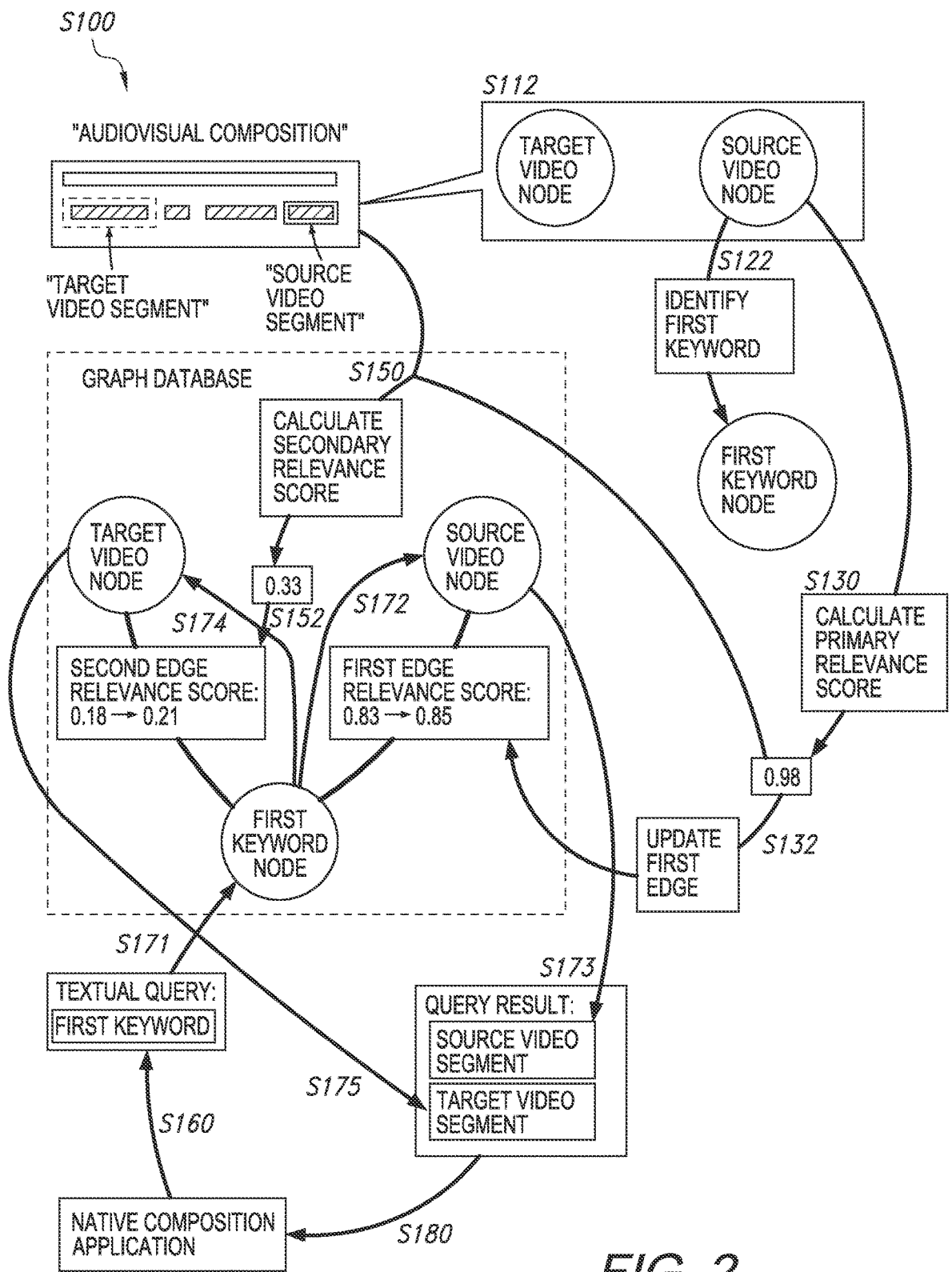
FIG. 2 is a flowchart representation of one variation of the method.

As shown in FIG. 2, one variation of the method S100 includes: accessing an audiovisual composition including a target video segment represented by a target video node and a source video segment represented by a source video node in Block S112; identifying a first keyword for the source video segment based on content associated with the source video segment, the first keyword represented by a first keyword node in Block S122; calculating a primary relevance score for the first keyword relative to the source video segment in Block S130; updating a first edge connecting the first keyword node and the source video node based on the primary relevance score in Block S132. This variation of the method S100 also includes, in response to presence of the target video segment and the source video segment in the audiovisual composition: calculating a secondary relevance score for the first keyword relative to the target video segment based on a temporal position of the source video segment in the audiovisual composition, a temporal position of the target video segment in the audiovisual composition, and the primary relevance score for the first keyword relative to the source video segment in Block S150; and updating a second edge connecting the first keyword node and the target video node based on the secondary relevance score in Block S152. This variation of the method S100 further includes accessing a textual query including the first keyword in Block S160. This variation of the method S100 also includes, in response to the textual query including the first keyword: identifying the first keyword node representing the first associative keyword in Block S171; traversing the first edge from the first keyword node to access the source video node in Block S172; appending the source video segment represented by the source video node to a first query result based on the first edge in Block S173; traversing the second edge from the first keyword node to access the target video node in Block S174; and appending the target video segment represented by target video node to the first query result based on the second edge in Block S175. This variation of the method S100 also includes at a native composition application, rendering a representation of the first query result in Block Si80.

2. Applications

Figure 3:
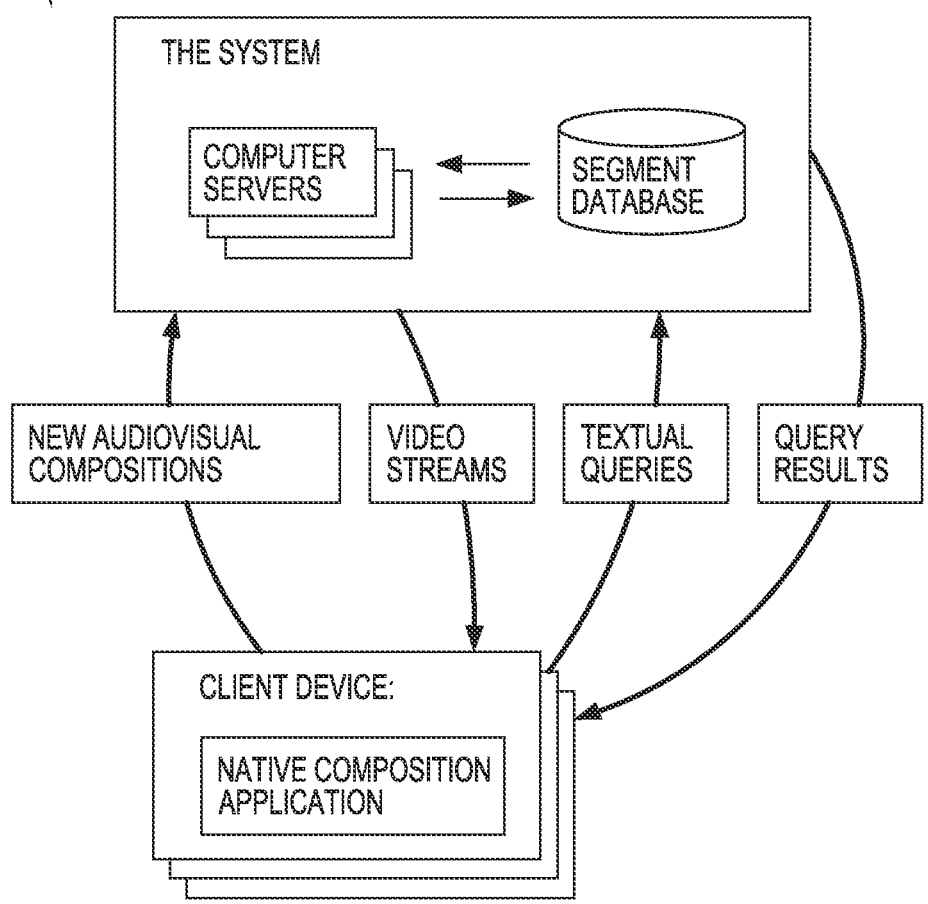
FIG. 3 is a schematic representation of a system.

Generally, the method S100 can be executed by a computing device or a network of computer servers (hereinafter "the system," shown in FIG. 3) interfacing with a native composition application executing on client devices (e.g., smartphones, tablets) in order to: establish conceptual associations between individual video segments in audiovisual compositions created by users of the native composition application; and, based on these conceptual associations, recommend suitable video segments for inclusion in new audiovisual segments in response to user queries. More specifically, users of the native composition application may select local (i.e., private) audio and visual media and/or remote (e.g., public) audio and visual media and arrange these media items into abbreviated audiovisual compositions (e.g., thirty seconds to a minute in length) including audio segments and/or video segments from the selected audio and visual media. Upon creation of an audiovisual composition by a user of the native composition, the system can upload a representation of this audiovisual composition to enable other users to: view this audiovisual composition; and adapt the audio segments and/or video segments included in the audiovisual compositions for use in new audiovisual compositions created by these other users. Thus, the system can observe the usage of a single video segment in hundreds or thousands of separate audiovisual compositions created by many different users to derive associations between these video segments and various concepts represented by keywords, thereby facilitating further creation of audiovisual compositions by users of the native composition application.

In particular, upon accessing a new audiovisual composition via an instance of the native composition application, the system can identify the discrete audio and video segments within the audiovisual composition. For any new audio or video segments not already represented in a database of the system, the system can identify keywords directly describing the content of these audio and video segments (i.e., descriptive keywords). Additionally, for each audio or video segment in the new audiovisual composition, the system can identify new keyword associations (i.e., associative keywords) based on the mutual inclusion and temporal relationship between these audio or video segments within the new audiovisual composition and based on the descriptive keywords already identified for these audio or video segments. For example, the system can identify "goal" as a descriptive keyword for a first video segment and identify "goal" as an associative keyword for a subsequent video segment that was not previously recorded as being associated with "goal" based on the temporal adjacency or concurrency of these video segments within an audiovisual composition. Thus, by executing these steps across many new audiovisual compositions, the system can construct a segment database, such as a graph database, representing relationships between video segments and a dictionary of keywords.

The system can then leverage this segment database defined by the audiovisual composition to generate responses to queries by content creators interested in obtaining video segments for inclusion in new audiovisual compositions. For example, the system can receive a textual query from a user via the native composition application, extract known keywords from this textual query, and serve a query result to the user including video segments creatively relevant to the extracted keywords. Because the system generates associations between video segments based on temporal relationships between video segments in existing audiovisual compositions, the system can generate query results that reflect the creative intent of the user, as opposed to simply the most relevant video segment to the user's query. In one implementation, the system can even render representations of a set of video segments resulting from a textual query in a visual order representing established temporal relationships between each video segment in the set of video segments and the keywords identified in the textual query.

Additionally or alternatively, the system can leverage the segment database to serve prompts—to interested parties such as content creators or advertisers—indicating sentiment associated with an audio or video segment, the social reach of the audio or video segment, or the identified keyword associations of the audio or video segment. Additionally, the system can automatically serve prompts to users of the system in response to fulfillment of particular associative criteria. For example, the system can notify a user upon detecting that a particular video segment has been associated with a set of negative concepts and automatically withdraw the video segment from availability on the native composition application in response to detecting these negative concepts.

To accomplish the aforementioned functionality, the system can: access new audiovisual compositions; identify a descriptive keyword that is related to a source video segment; and calculate a primary relevance score indicating the magnitude of the association between the descriptive keyword and the source video segment. After completing this process for each video segment in the audiovisual composition, the system can: identify associative keywords for a target video segment based on the descriptive keywords of other video segments in the audiovisual composition; and calculate secondary relevance scores for each of these associative keywords based on the temporal position of the target video segment, the temporal position of the source video segment corresponding to each associative keyword, and the primary relevance score of each associative keyword relative to its source video segment. Subsequently, the system accumulates these primary relevance scores and secondary relevance scores across instances of the video segment in multiple audiovisual compositions over time to calculate cumulative relevance scores for each identified keyword-video-segment association.

The system can identify descriptive keywords for video segments in multiple distinct ways. In one implementation, the native composition application can query the user to enter keywords describing the video segment into the native composition application. In another implementation, the system can analyze the audio segment or video segment to extract descriptive keywords based on the content of the audio segment or video segment. For example, the system can execute audio analysis and/or speech recognition models to extract descriptive keywords for an audio or video segment regarding the audio content of the audio or video segment. Additionally, or alternatively, the system can perform video analysis and/or image recognition algorithms to extract descriptive keywords from video segments based on the visual content of the video segment. Thus, the system can extract descriptive keywords from each audio segment and video segment in the audiovisual composition. Additionally, the system can generate primary relevance scores for each descriptive keyword of an audio or video segment based on the degree to which each descriptive keyword is relevant to the audio or video segment with which it is associated.

Likewise, the system can identify associative keywords and calculate the corresponding secondary relevance score via multiple means. For example, the system can identify an associative keyword for a target video segment based on the descriptive keyword of a source video segment in the audiovisual composition. The system then calculates a secondary relevance score for the associative keyword relative to the target video segment based on the relationship (e.g., adjacency, interval, concurrency) between the source video segment with which the keyword was originally associated (e.g., as a descriptive keyword) and the target video segment with which the associative keyword is associated. The system can also calculate the secondary relevance score of associative keywords scaled by the primary relevance score of the keyword.

3. Terminology

Generally, the system is primarily described with respect to generating associative metadata for video segments in the audiovisual composition. However, Blocks of the method S100 can also be applied to audio segments of audiovisual compositions.

Generally, the system is primarily described as identifying "keywords" including "descriptive keywords" and "associative keywords" and calculating "relevance scores" for these keywords including "primary relevance scores" and "secondary relevance scores" respectively. However, a single keyword can be identified as both a descriptive keyword and an associative keyword relative to the same video segment across a corpus of audiovisual compositions. Thus, the system can separately calculate and track a "cumulative primary relevance score" and a "cumulative secondary relevance score" for a keyword-video-segment pair. Alternatively, the system can aggregate primary relevance scores and secondary relevance scores for a keyword relative to a video segment into a single "aggregate relevance score."

Additionally, although the system is described with respect to keywords, the system can also represent phrases, complex visual characteristics, or any other concept as a "keyword" in the database of the system.

Generally, the system is described as identifying keywords with respect to "source" video segments and "target" video segments. A source video segment, as referred to herein, is a video segment for which the system has identified a descriptive keyword (i.e., a keyword directly relevant to that video segment). However, the system can identify the descriptive keyword identified relative to a source video segment as an associative keyword relative to a target video segment, a video segment of interest within the same audiovisual composition as the source video segment. Therefore, video segments may be referred to herein as either source video segments or target video segments with reference to a particular keyword.

4. Audiovisual Compositions

Generally, the system can access an audiovisual composition including a target video segment and a source video segment in Block S110. More specifically, the system can receive a representation of an audiovisual composition generated by a native composition application executing on a smartphone or tablet—to compile local (i.e., private) audio and visual media and/or remote (e.g., public) audio and visual media selected by a user into abbreviated compositions including both audible and visual elements from the selected audio and visual media.

In particular, a native composition application executing on a mobile computing device can automatically set durations of video segments from each video in a set of selected videos based on a selected (or default) duration of the composition, an order of the video segments, and/or a quality (e.g., a tempo, beats per minute) of an audio track selected for the composition. The native composition application can set a duration of an audio segment from the selected audio track based on the selected (or default) duration of the composition, record edits to the start, center, or stop points for each video segment and the audio segment, record changes to the order or duration of video segments in the composition, and repeat the foregoing methods and techniques in response to selection of additional or alternative video and in response to selection of an alternative audio track. The native composition application can store the start and stop points for each video segment and for the audio track, local or remote address of the audio and video media, video segment order, and/or visual overlays and filters, etc. in a meta file of relatively small file size and distinct from audio and video media selected for the composition. The native composition application can then upload the meta file and relevant portions of any local media designated for the composition to the system for subsequent analysis according to the method S100. Additionally, the system can store meta files, audio content, and visual content for a number of audiovisual compositions generated by users over time in order to aggregate associative metadata for video segments included in these audiovisual compositions.

An instance of the native composition application executing on a computing device can implement methods and techniques like those described above to enable the user to replace or modify audio content, visual content, video order, video mask positions, etc. in the audiovisual composition—thereby creating a second composition related to but different from the original composition—and the native composition application can generate a second meta file accordingly. The system can collect this second meta file and relevant portions of local audio and video media specified in the second audiovisual composition and store these data in the remote database. Therefore, the system can generate additional associative metadata for these revised audiovisual compositions.

One implementation of the native composition application is described further below. However, additional methods related to the creation and sharing of audiovisual compositions are described in U.S. Pat. No. 10,299,016, which is incorporated by reference.

4.1 Media Selection

Generally, the native composition application can record selections of various audio and visual media, such as through a user interface, in preparation for compilation of these media into an audiovisual composition. In particular, the native composition application can record a user's selection of at least one audible resource ("audio track") and at least two visual resources (e.g., videos, static images). The method S100 is described herein as relating to video segments, which may include both videos and static images.

In one implementation, the native composition application accesses local audible and visual media for the audiovisual composition. In one example, the native composition application accesses audio files stored locally on the computing device—such as a purchased song stored in local memory or an audio recording made and stored locally on the computing device—and presents these audio files in visual format within the user interface for selection of a particular audio track by the user. In this example, once the user selects a particular audio track, the native composition application similarly accesses visual files stored locally on the computing device—such as videos and/or photographs recorded by the computer system and stored in local memory—and presents these visual files in visual format within the user interface (or "editing portal) for selection of all or a subset of these visual files by the user.

The native composition application can also access public audible and visual media. For example, the native composition application can retrieve media from a public media database associated with the remote computer system, such as videos, photographs, and/or audio tracks uploaded by other users and stored in the public media database upon completion of audiovisual compositions, as described herein. In this example, the public media database can serve only media authorized for public access within the native composition application, and the native composition application can also support purchase of such media from corresponding artists and other users. The native composition application can also access media from a third-party database, such as hosted by an external media distribution company. For example, the native composition application can access branded visual content (as described below) supplied by a marketing company, access original song titles supplied by recording studios and labels, and retain copies of media or licenses to such media purchased by the user through the user interface. For example, the native composition application executing on the computing device can receive both: a selection for a private video recorded at and stored on the first computing device and not currently permitted for viewing by persons other than those authorized by the user (e.g., by "sharing" the audiovisual composition with another user); and a second video recorded at another computing device, stored in the remote database, and assigned a general permission enabling all users on a platform hosting the public media database to view the second video and to insert frames of the second video into their personal audiovisual compositions.

However, the native composition application can access any combination of audible media and visual media stored locally on the computing device and/or remotely in a public or private database.

Generally, the native composition application can define an initial or default order for visual media selected for an audiovisual composition. For example, the native composition application can automatically order two or more selected videos according to the order in which the videos were selected from local memory and from the public media database—accessed through an editing portal within the native composition application—by the user. In another example, the native composition application automatically arranges two or more selected videos in chronological order according to timestamps stored in video metadata (e.g., in sequential order of time at which recordation of each selected video was started or completed). In this example, the native composition application can extract a location from metadata stored with each selected video, such as in the form of a GPS or other geospatial coordinate; if all or at least a threshold proportion (e.g., 70%) of the selected videos include location metadata indicating that the selected videos were recorded at a common geographical area, such as within a threshold radius of one-quarter mile, the native composition application can automatically set an initial order of the set of videos chronologically based on a timestamp stored in metadata for each selected video. However, in this example, if the set of selected videos were recorded at disparate locations, the system can set a default order corresponding to an order in which the user selected the set of videos for an audiovisual composition.

However, the native composition application can collect media and set various initial (or default) parameters for the composition in any other way.

4.2 Audiovisual Masks

The native composition application can set a default position and a default duration of a video mask for each video in the set of videos based on the first audio track, the first order, and the first duration of the composition, wherein a video mask defines a contiguous subset of frames in a corresponding video for insertion into the composition.

In one implementation, the native composition application analyzes the selected audio track to determine (or "characterize") a tempo (e.g., beats per minute, cadence) of the audio track and then selects a video clipping model for the selected videos based on the tempo of the audio track. In particular, the video clipping model can define a preset duration of each video segment from each selected video based on the tempo of the audio track song, the order set for the videos in the composition, and the selected duration of the composition. The native composition application can also automatically set a position of each video mask in its corresponding video, such as at the beginning of the video or centered within the duration of the video. Thus, as the composition is generated, edited, and played-back in real-time within the user interface, the native composition application can automatically apply each video mask to its corresponding video based on the preset duration defined in the video mask and the position of the video mask in the video such that only frames in a video coincident its corresponding video mask are replayed; and the total duration of frames replayed across all selected videos (and introduction and/or conclusion frames) totals the selected duration of the composition. As the video segments (i.e., sequences of frames in videos bound by corresponding video masks) are replayed within the user interface, the user can shift the position of a video mask along its corresponding video to select alternative frames of the video to replay in the composition, and the native composition application can record such changes to the position of a video mask.

In one example, the native composition application inserts a value for the tempo of the audio track, the number of videos selected for the composition, and/or the selected duration of the composition into a parametric video clipping model to calculate a preferred, order-specific duration of each video in the composition. However, the native composition application can implement any other model type to generate video masks for each selected video for the composition.

In another example, the native composition application can generate default video masks specifying various durations for the selected videos, such as shorter durations for videos at the beginning and end of the ordered set of videos and longer durations for videos near the middle of the ordered set of videos. Furthermore, the native composition application can generate a set of default masks that each define a substantially unique initial duration in the set of default masks but that, in aggregate, sum to a duration equal to the default, initial, or user-elected duration of the composition.

Furthermore, if the total length of a particular video selected for the composition is less than the duration of its corresponding video mask, the native composition application can redistribute playback time from the particular video to video masks for other videos selected for the composition or automatically (or prompt the user to manually) shift the particular video to an alternative position associated with a video mask of a shorter duration within the composition.

The native composition application can thus automatically generate a default set of video masks for the set of selected videos for the composition, and the native composition application can automatically adjust the durations of select video masks based on adjustments to various parameters of the composition made by the user, such as insertion of an additional video into the set of videos, deletion of a video from the set of videos, a change in the duration of the composition, a change in the order of the set of videos in the composition, selection of an alternative audio track for the composition, etc. The native composition application can thus automatically adjust existing video masks or generate new video masks substantially in real-time based on edits made to parameters of the composition by the user.

The native composition application can similarly generate an audio mask for the selected audio track, wherein the audio mask defines a sample from the selected audio track that is replayed over the duration of the composition. In particular, the native composition application can implement similar methods and techniques to automatically generate an audio mask that defines the start time and the end time of a sample of the audio track inserted into the composition. The native composition application can also position the audio mask within the audio track, such as at the beginning of the audio track, in the center of the audio track, aligned with a known refrain or chorus within the audio track, or aligned with a crescendo within the audio track, etc. Furthermore, as described above, the native composition application can update or modify the audio mask based on changes to the composition made by the user. For example, the native composition application can add additional time to the end of the audio mask only (rather than to both the beginning and the end of the audio track, as for a video mask) in response to selection of a longer composition duration by the user. Similarly, if the user selects a shorter composition duration, the native composition application can automatically remove time from the end of the audio mask only (rather than from both the beginning and the end of the audio track mask, as for a video mask).

However, the native composition application can generate one or more audio or video masks in any other way and can modify an audio or video mask according to any other parameters.

4.3 User Interface and Composition Editing

As described above, the native composition application can set an initial (or default) position of a video mask in the center of its corresponding video. During editing, the native composition application can play video segments from each video according to the order of the video segments in the audiovisual composition, where each video segment of a video is defined by the position of its corresponding video mask along the duration of the video. In particular, the native composition application can redefine a position of a particular video mask corresponding to a particular video in the set of videos in response to manual repositioning of the particular video mask within the particular video through an editing portal executing on the first computing device.

The native composition application can repeat this process in order for each video selected for the composition, and the user can adjust the position of each video mask along its corresponding video to adjust the contiguous sequence of frames in these videos that are replayed in the composition.

The native composition application can similarly set an initial position of the audio mask within the selected audio track, such as aligned with the beginning of the audio track, aligned with the center of the audio track, or aligned with a position within the audio track at which the relative audio level of the audio track exceeds a threshold audio level. When the composition is replayed within the user interface, the native composition application can play back a particular segment of the audio track bounded by the audio mask. For example, as the sequence of video segments from the selected videos are replayed within the user interface, the native composition application can render a linear representation of the audio track and a representation of the audio mask positioned over the audio track (and scaled to the duration of the audio track) within the user interface. The user can thus drag the audio mask icon along the audio track icon to select an alternative section of the audio track for playback in the composition, and the native composition application can again update the composition accordingly in real-time.

4.4 Meta File

Generally, the native composition application generates a meta file (e.g., shown in FIG. 4) specifying parameters for accessing, clipping, cropping, ordering, and combining various audio and video resources into the audiovisual composition compiled and edited by the user. Furthermore, the native composition application functions to distribute the meta file and local content for an audiovisual composition to a remote database from which the system can access this representation of this audiovisual composition in order to generate associated metadata for this composition. In particular, the native composition application avoids generation of a master audio/video composition file when the composition is complete and can instead generate a meta file that can be merged with audio and visual content to recreate the composition at the same or other computing device. When the composition is edited by the same user or other user at a later time, the corresponding instance of the native composition application can generate a new meta file for the altered composition, but upload only the new meta file and any added local media to the remote database rather than all media for the new composition, thereby limiting data storage requirements for compositions that are edited by one user or shared and edited by multiple users over time.

The native composition application can generate a meta file that specifies addresses for (or pointers to) local and/or remote audio and visual content selected for the composition and that defines how distinct media files are combined to reproduce the composition. For example, the meta file can specify parameters for visual content in the composition, such as: an Internet address for each selected video or digital photograph; the duration of each video segment; the center, start point, and/or end point of each video segment; transitions between consecutive video segments (e.g., fades); the order of the visual content; cropping parameters (e.g., size, shape, and position of both landscape and square cropping boundaries for each frame in each video segment); text overlays (e.g., position, orientation, typeface, text string); color filters; etc. In this example, the meta file can also specify parameters for audible content in the composition, such as: an Internet address for the full or partial audio track; the duration of the audio segment; and/or a center, start point, and/or end point of the audio segment.

The native composition application can also define parameters for multiple video formats and composition durations. For example, the native composition application can generate a meta file that defines positions of both square and landscape cropping boundaries for each frame in each video segment in the composition.

The native composition application can thus generate a meta file locally at the computing device and then upload the meta file to the remote database. The native composition application can also upload local audio and local visual content (e.g., videos, photographs, audio tracks) selected for the composition to the database, such as local audio and local video content not currently stored in the remote database.

5. Segment Database

Generally, the system stores representations of audio and/or video segments, keywords, and corresponding relevance scores, in the segment database. More specifically, the system can define a relational or graph database structure for the segment database enabling traversal of the segment database when generating various outputs further described below.

Figure 4:
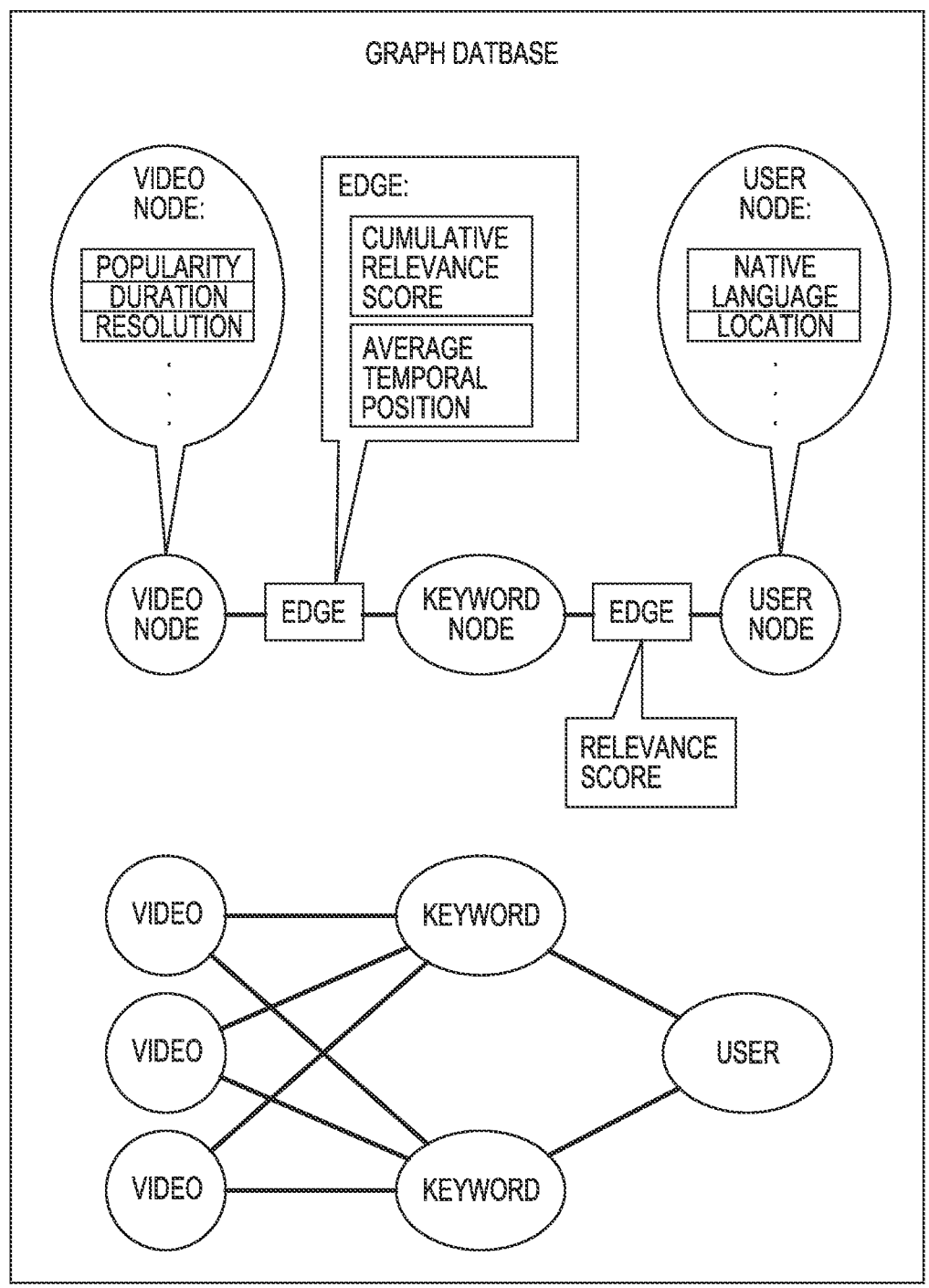
FIG. 4 is a representation of a graph database.

In one implementation, shown in FIG. 4, the system defines a graph database as the segment database. In this implementation the system can represent each distinct video segment as a node in the graph database. More specifically, the system can access an audiovisual composition comprising a target video segment represented by a target video node and a source video segment represented by a source video node in Block S112. Likewise, the system represents each distinct keyword as a second type of node in the graph database. The system can then represent associations and the relevance scores relating a keyword to a video segment as an edge between a video node (or audio node) and a keyword node in the graph database.

In one example of this implementation, the system can store additional metadata in association with each video node in the graph database (e.g., popularity, visual qualities such as resolution or frame rate). In another example, the system can store additional metadata pertaining to the relationship between a keyword and a video segment in each edge in the graph database. More specifically, the system can store an edge representing the temporal position of a source video segment relative to the temporal position of a target video segment. In this example, the system can store an average temporal position of a keyword relative to a target video segment in an edge between the keyword node representing the keyword and the video node representing the target video segment, such that the average temporal position indicates the average position of a source video segment for the keyword relative to the target video segment (if the target video segment is the source video segment for the keyword the system can record a value of zero as the temporal position). Alternatively, the system can define directional edges, such that the directionality of the edge indicates whether the source video segment of the keyword is positioned prior to or subsequent to the target video segment in a corpus of audiovisual compositions. In this example, the system can define multiple edges (i.e., parallel edges) between the same pair of a keyword node and a video node.

If the system has not yet identified an association between a keyword and a video segment, the system can define a new edge in the graph database. Thus, for a new association between a target video segment and a keyword, the system can: represent a source video segment as a source video node in a graph database; represent a target video segment as a target video node in the graph database; represent a first descriptive keyword for the source video segment and a first associative keyword for the target video segment as a first keyword node in the graph database; in response to identifying the first descriptive keyword for the source video segment and in response to calculating the primary relevance score for the first descriptive keyword relative to the source video segment, define a first edge in a graph database connecting the first keyword node and the source video node, the first edge representing the primary relevance score; and, in response to identifying the first descriptive keyword for the source video segment as the first associative keyword for the target video segment, define a second edge in a graph database connecting the first keyword node and the target video node, the second edge representing the secondary relevance score.

Alternatively, if an edge already exists associating a keyword node and a video node, the system can update the relevance score (and/or other data represented by the edge) based on the primary relevance score or secondary relevance score calculated for the inclusion of the video segment in a new audiovisual composition. For example, the system can sum an existing cumulative relevance score stored in association with an edge with a newly calculated primary secondary relevance score calculated in response to an inclusion of a target video segment in a new audiovisual composition.

In another implementation in which the video segment database is a relational database, the system can represent keywords associated with a video segment as a list of keyword identifiers; and store these keyword identifiers in a column of the database entry representing the video segment.

6. Identifying and Tracking Video Segments

Generally, in Block S110, the system can access a representation of an audiovisual composition in order to identify a set of video segments. More specifically, the system can: access a meta file representing an audiovisual composition: identify video masks and corresponding video resources for each video mask; and assign an identifier to each combination of video mask and video resource. Thus, the system can keyword associations for video segments sourced from different parts of the same video resource. For example, the system can identify a first video mask of a first video resource as a first video segment and a second video mask of the first video resource as a second video segment. Additionally, the system can: identify combinations of video masks and video resources present in a meta file; compare these combinations with a database of previously existing video segments; and, in response to detecting a match between a newly accessed combination of a video mask and a video resource and a previously existing video segment, the system can identify the newly accessed combination as the previously existing video segment.

In one implementation, the system applies a set of matching criteria to a newly accessed video mask in order to determine whether the system is already tracking a similar or identical video segment. In one example, the system can: calculate the overlap between a newly accessed video mask and a video mask of a previously identified video segment; and, in response to calculating an overlap (e.g., in proportion of frames) greater than an overlap threshold, the system can identify the newly accessed video mask as the previously existing video segment.

In another example, the system can automatically identify scenes in a video resource and identify video masks as video segments based on the set of scenes spanned by each video mask. For example, if the system identifies a first scene and a second scene in a video resource, the system can classify a first video mask spanning the first scene of the video resource as a first video segment, a second video mask spanning the first scene and the second scene of the video resource as a second video segment, and a third video mask spanning the second scene of the video resource as a third video segment. Thus, the system can identify video masks from meta files based on the particular combination of scenes in a corresponding video resource spanned by each video mask.

Generally, upon identification of a new video segment, the system can assign an identifier for the video segment and store this identifier in a segment database (e.g., a relational database or a graph database). The system can then generate associative metadata describing the relationships between video segments and keywords identified by the system. This process is described in additional detail below.

7. Identifying Descriptive Keywords

Generally, the system can identify a first descriptive keyword for the source video segment based on content associated with the source video segment in Block S120. More specifically, the system can automatically identify keywords relating to a video segment by executing a taxonomic video classification model (or by sampling frames from the video segment and executing a taxonomic image classification model). Additionally or alternatively, the system can prompt (e.g., via the native composition application) a user to enter (e.g., via a text interface or a pulldown list) descriptive keywords for a video segment she has created. Furthermore, in implementations in which the native composition application includes commenting functionality, the system can extract descriptive keywords from comments pertaining to the video segment. Thus, the system can identify descriptive keywords for each newly created video segment or for the audiovisual composition as a whole. In implementations where the system identifies descriptive keywords for the audiovisual composition as a whole, the system can subsequently link these descriptive keywords to individual video segments in the audiovisual composition.

Additionally, upon identifying a set of descriptive keywords for a video segment, the system can compare these keywords to an existing set of keywords stored in the segment database (e.g., in association with existing video segments stored in the segment database) and, in response to identifying that the keyword is not present in the segment database, generate a database object representing the descriptive keyword in the segment database. For example in a graph database implementation of the segment database, the system can identify a first keyword for the source video segment based on content associated with the source video segment and representing the first keyword as a first keyword node in Block S122. Thus, if a keyword node representing the keyword is not present in the segment database, the system can generate a new keyword node within the segment database.

Furthermore, the system can identify descriptive keywords for previously created video segments that have been included in a new composition, thereby associating the video segment with additional descriptive keywords as the video segment is included in additional audiovisual segments over time.

7.1 User Input

In one implementation, the system can generate descriptive keywords for video segments based on user input to the native composition application. More specifically, the native composition application, upon completion of an audiovisual composition in the user interface for composition editing, can display a keyword interface for entering descriptive keywords pertaining to the audiovisual composition. The system can then receive, via the keyword interface of the native composition application a user input designating the first descriptive keyword. Therefore, as users create audiovisual compositions, the system can, via the native composition application, prompt users to provide additional identifying information about each video segment in the audiovisual composition.

In one example, the system interfacing with the native composition application can execute a taxonomic video classification model on each video segment and recommend a set of highest ranked concepts generated by the model. The native composition can then display these concepts to the user and enable the user to select concepts that are applicable to each video segment in the native composition application.

In another example, the native composition application can display a text entry field, drop down menu, or any other user interface element in the keyword interface to enable users to textually generate descriptive keywords or select descriptive keywords from a predetermined set of descriptive keywords. Alternatively, the native composition application can enable hashtags for application to video segments and/or audiovisual compositions as a whole.

7.2 In-Composition Comments

In one implementation, the system can enable in-composition comments by users via the native composition application and can generate descriptive keywords for video segments in the audiovisual composition based on these in-composition comments. More specifically, the system can, at the native composition application, receive a timestamped comment concurrent with a source video segment; and extract a descriptive keyword from the timestamped comment. Thus, via a natural language processing algorithm and based on concurrency between timestamped comments and a source video segment, the system can associate these extracted keywords with the source video segment in the audiovisual composition.

In one example, the native composition application can enable comments on the audiovisual composition application as a whole and the system can: extract keywords from these comments; and associate these extracted keywords with each of the video segments in the audiovisual composition. In another example, the native composition application can display an interface for commenting on the audiovisual composition while viewing the audiovisual composition. Thus, each comment entered into the native composition is characterized by a timestamp that corresponds to a particular video segment. In this implementation, the system can associate descriptive keywords extracted from these timestamped comments to the particular video segment concurrent with or immediately prior to the timestamp of the comment (e.g., to account for an average delay between comment creation and subsequent input into a text field of the native composition application).

7.3 Visual Content Analysis

Generally, the system can generate descriptive keywords based on the content of the video segment and based on a taxonomic video classification model. More specifically, the system can execute a taxonomic video classification model on a source video segment to generate a classification vector associated with the source video segment; and extract a descriptive keyword based on a classification in the classification vector. Thus, the system can automatically identify descriptive keywords relevant to a video segment without receiving user input pertaining to the video segment.

In particular, the system can: extract frames from the video resource corresponding to the video segment, within the video mask of the video segment; input these frames into a taxonomic video classification model (e.g., YT8M) to obtain a classification vector indicating a confidence score for each of a set of classifications; and generate a set of descriptive keywords for the video segment based on the set of classifications. Thus, the system can automatically identify a set of keywords representing the content of the video segment. For example, upon executing the taxonomic video classification model on a set of frames from a video segment, the system can generate a classification vector indicating that the content of the video pertains to "golf" with a confidence score of 0.65, "sports" with a confidence of 0.55, "fishing" with a confidence of 0.40, and "nature" with a confidence of 0.30, where these confidence scores are the top four confidence scores present in the classification vector.

In one implementation, the system ranks classifications based on the confidence score of each classification in the classification vector and identifies descriptive keywords based on a threshold number of highest ranked classifications. Referring to the previous example, the system can select the top three ranked classifications as descriptive keywords and, therefore, generate a set of descriptive keywords including "golf," "sports," and "fishing." Alternatively, the system can generate descriptive keywords based on a threshold confidence score, thereby only generating descriptive keywords for classifications in the classification vector exceeding the threshold confidence score. In the previous example, this implementation of the system can identify a set of descriptive keywords including "golf" and "sports" given a confidence threshold of 0.50.

However, the system can automatically generate descriptive keywords for a video segment based on the visual content of the video segment in any other way.

7.4 Audio Content Analysis

Generally, the system can generate descriptive keywords based on audio content of the audiovisual composition occurring during a video segment for audiovisual compositions that include audio content either incorporated with or as a separate editing layer over the set of video segments. More specifically, identify a concurrent audio segment of the audio content to the source video segment; execute a speech recognition model on the concurrent audio segment to generate a set of audible words; and extract the first descriptive keyword from the set of audible words. Thus, the system can identify concepts present in the audio content of the audiovisual composition and associate these concepts with individual video segments in the audiovisual composition.

In particular, the system can: identify a concurrent audio segment to the video segment in the audiovisual composition; execute a speech recognition model on the concurrent audio segment to transcribe speech in the concurrent audio segment; and extract descriptive keywords for the video segment based on the speech in the concurrent audio segment. Thus, the system can obtain additional associative metadata in the form of descriptive keywords based on audio content concurrent with the video segment.

The system can execute the speech recognition model on audio content present in the video segment itself or concurrent audio content from a concurrent audible media in the audiovisual composition. In one example, the system can recognize speech present in the original audio of the video segment. In another example, the system can recognize speech from audible media layered onto the video segment in the audiovisual composition.

Upon identifying speech in a concurrent audio segment to a video segment, the system can execute natural language processing algorithms to identify relevant concepts and/or particular words from a transcript of the identified speech of the audio segment. The system can then generate descriptive keywords from these identified concepts or words.

However, the system can extract descriptive keywords from audio content in any other way.

8. Calculating Primary Relevance Scores

Generally, in Block S130, the system can calculate a primary relevance score for a descriptive keyword relative to a source video segment in order to indicate how relevant each descriptive keyword is to the video segment. More specifically, the system can: identify the source video segment of the descriptive keyword and, based on the source of the descriptive keyword, execute a primary relevance score function to calculate a primary relevance score for the descriptive keyword. Thus, the system can provide more detailed metadata indicating how related each descriptive keyword is to its corresponding video segment.

Upon calculating a primary relevance score for a descriptive keyword, the system can store this relevance score in the segment database in association with the descriptive keyword. For example, in implementations in which the segment database is a graph database, the system can store the primary relevance score for a descriptive keyword in the edge between a node representing the video segment and a node representing the descriptive keyword. In implementations in which the segment database is a relational database, the system can represent the primary relevance score for a descriptive keyword in a relevance score column in a table corresponding to a video segment. However, the system can represent video segments, descriptive keywords, and primary relevance scores in any other way.

In one implementation, the system can score descriptive keywords generated automatically based on audible or visual content of the video segment, such as based on the confidence score corresponding to the descriptive keyword calculated by execution of a taxonomic video classification model or a natural language processing algorithm. More specifically, the system can calculate a primary relevance score for a descriptive keyword based on a confidence score for a classification in a classification vector generated by the taxonomic video classification model. For example, in response to the system calculating a classification score for a descriptive keyword of 0.65 via the taxonomic video classification model, the system can calculate the primary relevance score of the descriptive keyword at 0.65.

In another implementation, the system can score descriptive keywords based on the source of the descriptive keyword. For example, the system can assign: a primary relevance score of 0.80 to descriptive keywords generated based on user input, a primary relevance score of 0.80 to descriptive keywords generated from an in-composition comment with a timestamp concurrent with video segment; and a primary relevance score of 0.50 to a descriptive keyword generated from a comment on the audiovisual composition of the video segment.

However, the system can generate primary relevance scores for descriptive keywords in any other way.

9. Identifying Associative Keywords

Generally, the system identifies a descriptive keyword for the source video segment as a first associative keyword for the target video segment in Block S140. More specifically, the system can identify a set of associative keywords based on descriptive keywords of a set of source video segments in the audiovisual composition, each associative keyword in the set of associative keywords corresponding to a source video segment in the audiovisual composition. In particular, the system can associate a video segment with the descriptive keywords of other video segments in the same audiovisual composition by identifying a set of associative keywords from descriptive keywords of other video segments in the same audiovisual composition. Thus, the system can track metadata for a target video segment by collecting metadata pertaining to video segments neighboring the target video segment. Therefore, the system can track associations based on temporal-positional relationships between video segments in the audiovisual composition. For example, if a first video segment neighbors a second video segment that is associated with a descriptive keyword, such as "golf," there may be a high probability that the first video segment is also related to "golf."

In one implementation, the system can generate associative keywords by compiling the descriptive keywords associated with all other video segments in an audiovisual composition of a video segment. Alternatively, the system can generate associative keywords for a video segment from descriptive keywords of other video segments within a threshold number of positions of the video segment (e.g., within the audiovisual composition). For example, the system can generate associative keywords for a video segment based on descriptive keywords from video segments within two positions of the video segment (i.e. the neighboring video segments in the audiovisual composition and the neighbors of those video compositions).

In another implementation, the system can: identify a set of similar video segments to the video segment in the audiovisual composition of the video segment based on the taxonomic video classification model; and identify associative keywords for the video segment based on the descriptive keywords of the set of similar video segments.

In yet another implementation, the system can identify associative video segments by executing a combination of the above-described processes.

10. Calculating Secondary Relevance Scores

Generally, the system can, for each associative keyword of a target video segment, calculate a secondary relevance score for the associative keyword based on an adjacency of the source video segment of the associative keyword to the video segment in the audiovisual composition and a primary relevance score of the associative keyword relative to the source video. More specifically, the system can: calculate a secondary relevance score for an associative keyword relative to a target video segment based on: a temporal position of the source video segment for the associative keyword in the audiovisual composition; a temporal position of the target video segment in the audiovisual composition; and the primary relevance score for the descriptive keyword relative to the source video segment in Block S150. In particular, the system can calculate a secondary relevance score for associative keywords based on the primary relevance score of the descriptive keyword from which the associative keyword was generated and based on the adjacency (a number of positions in the audiovisual composition separating the source video segment from the target video segment), delay interval (i.e., an amount of time separating the target video segment and the source video segment), and/or concurrency (in the case of windowed transitions, fade transitions, or any other transition between videos) between the target video segment and the source video segment. Thus, the system can record the magnitude of the association between a target video segment and associative keywords derived from a separate video segment in the audiovisual composition.

For example, the system can generate an associative keyword for a target video segment in an audiovisual composition based on a descriptive keyword for a source video segment in the audiovisual composition. The system can calculate a secondary relevance score based on the primary relevance score of the descriptive keyword of the second video segment and the temporal relationship (i.e., adjacency, delay interval, and/or concurrency) between the target video segment and the source video segment in the audiovisual composition.

Generally, the system can define adjacency between the target video segment and the source video segment based on a number of intervening video segments in the audiovisual composition. For example, the system can measure an adjacency of one for a source video segment immediately neighboring the target video segment, an adjacency of two for a source video segment with an intervening video segment between it and the target video segment, an adjacency of three for a source video segment with two intervening video segments between it and the target video segment. In one implementation, the system can indicate an adjacency of zero for representations of descriptive keywords stored in the segment database. More specifically, the system can: calculate an adjacency of a source video segment to a target video segment based on the temporal position of the source video segment in the audiovisual composition and the temporal position of the target video segment in the audiovisual composition; and calculate a secondary relevance score for the associative keyword based on the adjacency of the source video segment to the target video segment and the primary relevance score for the descriptive keyword (from which the system generated the associative keyword) relative to the source video segment.

Generally, the system can measure a delay interval between a target video segment and a source video segment based on an intervening duration between the end of one video segment and the beginning of the other. In one example, the system can define a negative delay interval for a source video segment that precedes a target video segment and a positive delay interval for a source video that succeeds a target video segment.

Generally, the system can measure a concurrency between a target video segment and a source video segment based on a duration of a transition between the target video segment and the source video segment or a transition between the source video segment and the target video segment.

In one implementation, the system can calculate a secondary relevance score of an associative keyword proportional to the primary relevance score of the descriptive keyword from which the system generated the associative keyword and based on the adjacency, delay interval, and/or concurrency of a target video segment relative to the source video segment of the descriptive keyword. In one example, the system can calculate a second relevance score for an associative keyword by multiplying the primary relevance score by a predetermined multiplier corresponding to the adjacency of the video segment of the associative keyword and the source video segment of the descriptive keyword. For example, the system can multiply primary relevance scores by: a multiplier of 0.75 for an adjacency of one, a multiplier of 0.5 for and adjacency of two, and a multiplier of 0.25 for an adjacency of three.

In another implementation, the system can calculate a secondary relevance score of an associative keyword inversely proportional to a delay interval between the target video and the source video segment for the associative keyword. For example, the system can calculate a secondary relevance score as a function of the inverse of the delay interval between the target video segment and the source video segment and the primary relevance score of the associative keyword relative to its source video segment.

However, the system can calculate secondary relevance scores for associative keywords in any other way, such as via a function of multiple of the aforementioned temporal relationships between the target video segment and the source video segment.

11. Cumulative Keyword Scoring

Generally, the system can aggregate and accumulate primary relevance scores for descriptive keywords and secondary relevance scores for associative keywords across multiple instances of a video segment in different audiovisual compositions and over time to generate a corpus of associative metadata within the segment database. More specifically, for each new calculation of a primary relevance score or a secondary relevance score, the system can combine (e.g., via an accumulative function such as a sum, running average, or weighted running average) the newly calculated relevance score relating a keyword and video segment with an existing cumulative relative score describing the relevance of the keyword to the video segment stored in the segment database. Thus, as video segments are included in new audiovisual compositions, the system can consistently update the segment database to reflect changes in the usage of the video segment in audiovisual compositions over time.

In one implementation, the system can calculate and store, in the segment database, a cumulative primary relevance score distinct from a cumulative secondary relevance score for a keyword-video-segment pair. In this implementation, the system can identify the same keyword as a descriptive keyword and/or as an associative keyword for a target video segment based on the context of a particular audiovisual composition and calculate a primary relevance score and/or a secondary relevance score for the keyword relative to the target video segment according to the keyword's status as a descriptive keyword and/or an associative keyword. The system can then accumulate these primary relevance scores as a cumulative primary relevance score and accumulate these secondary relevance score as a cumulative secondary relevance score. The system can then, for example, store the cumulative primary relevance score and cumulative primary relevance score as two separate attributes of one edge between a keyword node representing the keyword and a video node representing the target video segment in the segment database or in association with parallel edges between the keyword node and the video node.

In another implementation, the system can aggregate both primary relevance scores and secondary relevance scores calculated for a given keyword-video-segment pair into a single cumulative relevance score representing the overall relevance of the keyword to the target video segment irrespective of the status of the keyword relative to the target video segment in each audiovisual composition. In this implementation, the system can execute Blocks of the method S100 to scale primary relevance scores relative to secondary relevancy scores such the magnitude of these scores are comparable when aggregated into a cumulative relevance score, as well as being indicative of the overall relevance of the keyword to the target video segment. Therefore, in this example, the system can store a single cumulative relevance score in association with an edge connecting a keyword node representing the keyword and a video node representing the target video in the segment database. Thus, the system can more easily generate a ranking of video segments in order of overall cumulative relevance of these video segments to a particular keyword.

In one implementation, the system can calculate an average relevance score for a keyword-video-segment pair and store this cumulative relevance score in association with an edge or relational database column representing the relationship between the keyword and the video segment. Alternatively, the system can calculate a weighted average of primary and secondary relevance scores for a combination of a keyword and a video segment. Thus, the system can track metadata describing a relationship between each keyword and each video segment in the segment database across a corpus of audiovisual compositions, whether the keyword is an associative keyword or a descriptive keyword in any particular instance of the video segment. Alternatively, instead of weighting each relevance score based on the status of the relevance score as either a primary or a secondary relevance score, the system can weight each relevance score based on other attributes of the audiovisual composition for which the system calculated the relevance score. For example, the system can weight each relevance score based on the popularity (e.g., number of distinct views) of the audiovisual composition for which the system calculated the relevance score.

In another implementation, the system can calculate a cumulative relevance score as a summation or weighted summation of individual relevance scores across the corpus of audiovisual compositions, thereby inherently accounting for popularity of the video segment based on the magnitude of the cumulative relevance score.

In yet another implementation, the system can calculate a cumulative relevance score by calculating another central measurement statistic, such as a median, of relevance scores. However, the system can aggregate primary relevance scores and secondary relevance scores in any other way.

In implementations including a graph database as the segment database, the system can update a first edge connecting a keyword node and a source video node based on a primary relevance score in Block S132; and/or update a second edge connecting the keyword node and a target video node based on a secondary relevance score in Block S152. More specifically, the system can access a first cumulative relevance score associated with the first edge; and update the first cumulative relevance score based on the primary relevance score. Likewise, the system can access a second cumulative relevance score associated with the second edge; and update the second cumulative relevance score based on the secondary relevance score. Thus, for each keyword identified in an audiovisual composition, the system can update multiple edges connecting the keyword node representing the keyword to each video segment in the audiovisual composition.

12. Serving Summary Prompts

Generally, the system can monitor the keywords and corresponding relevance scores that are associated with a target video segment as the target video segment is incorporated into many audiovisual compositions (by multiple user of the native composition application) over time and serve summary prompts to a creator of the video segment or another user of the system based on these relevance scores. More specifically, the system can: access an audiovisual composition including a target video segment and a source video segment, the target video segment associated with (i.e., created by) a user; and generate a report for the target video segment including a set of keywords associated with the target video segment (e.g., based on the corpus of audiovisual compositions represented in the segment database), the set of keywords including a first associative keyword; and serve the report to the first user. For example, the system can serve a prompt to a creator of the target video segment including a set of descriptive keywords associated with the target video segment (above a threshold cumulative relevance score), the cumulative primary relevance score for each descriptive keyword in the set of descriptive keywords, the set of associative keywords, and the cumulative secondary relevance score for each associative keyword in the set of associative keywords. Thus, the system can provide creators of video segments for the native composition application with real-time insights and analytics regarding the usage of video segments they created.

In one implementation, the system can generate a prompt summarizing each keyword that has been associated with the video segment and each keyword's corresponding cumulative relevance score. For example, the prompt can include a list of keywords and corresponding relevance scores associated with a video segment. Additionally, the system can include other video segments that are also frequently associated with the same keywords.

In another implementation, the system can prompt a creator of a video segment in response to detecting the presence of particular keywords in a list of notification keywords generated by the user. For example, the system can enable a creator of a video segment to input a list of notification keywords and in response to detecting these keywords provide a notification that the video segment has been associated with the intended keywords. Additionally, the system can fulfil an advertising contract and charge the creator of the video segment based on the detection of a subset of keywords in the set of notification keywords.

In yet another implementation, the system can prompt a creator of a video segment or another user of the system based on a sentiment score or other summary metric of the keywords and corresponding relevance scores associated with the video segment. For example, the system can calculate a sentiment score of the set of keywords associated with a video segment and prompt the creator of the video segment in response to the sentiment score exceeding a threshold sentiment score. More specifically, the system can: calculate a sentiment score based on the set of keywords for the target video segment; and, in response to the sentiment score exceeding a threshold sentiment score, generate the report for the target video segment and serve the report to the first user.

13. Video Segment Queries

Figure 5:
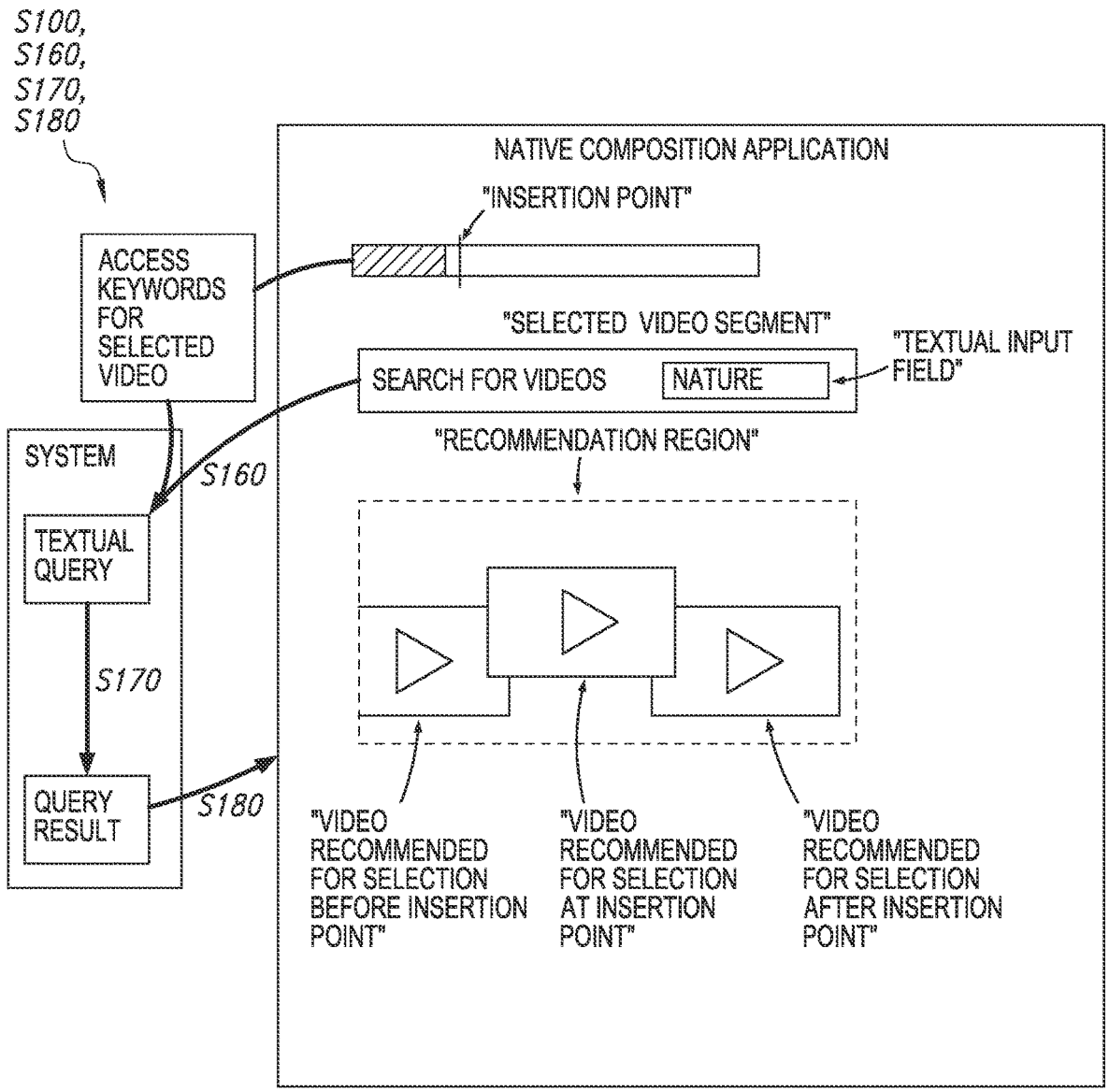
FIG. 5 is a flowchart representation of one variation of the method.

Generally, as shown in FIG. 5, upon generating a segment database representing associations between keywords and video segments based on a corpus of audiovisual segments, the system can access a textual query including a keyword such as an associative keyword in Block S160. More specifically, the system can, via the native composition, receive a series of user inputs to the native composition application as the user initiates creation of a new audiovisual composition; generate a textual query based on these user inputs; and generate a query result, based on the textual query, in the form of a set of recommended video segments for the user's audiovisual composition. Thus, the system leverages the corpus of existing audiovisual segments and the previously executed Blocks of the method S100 to aid a user in creating a new audiovisual composition by suggesting video segments that align with an intended narrative of the user. The system enables this by calculating cumulative relevance scores that reflect the temporal association between video segments in the audiovisual composition. Therefore, the system can predict segments that may follow from previously selected segments in the new audiovisual composition and that are relevant to any keywords entered as a textual input to the native composition application.

In one implementation, the system can interface with a native composition application rendering a composition creation interface in order to access a textual query including a keyword based on input from a user at the native composition application. The composition creation interface can include a textual input field, a current composition timeline that visually represents video segments already added to the new audiovisual composition, and a recommended video region within which the native composition application can render representations of video segments included in a query result generated by the system. In this implementation, the system can record user inputs such as a textual input to the textual input field, selection of a video segment for inclusion in the new audiovisual composition, and/or a selection of a current position within the current composition timeline to generate a query result and serve creatively relevant video segments to the user via the recommended video region. Thus, the system can generate the textual input from multiple types of user inputs to the native composition application In one example, the system can, in response to receiving a textual input (e.g., in the textual input field) including an input keyword at the native composition application, append the first input keyword to the textual query. Thus, by directly entering keywords relevant to her creative concept, a user may modify the textual query for new video segments.

In another example, the system can, in response to receiving a selection of a selected video segment for inclusion in a new audiovisual composition at the native composition application: identify a selected descriptive keyword for the selected video segment; and append the selected descriptive keyword to the textual query. Thus, the user may indirectly modify the textual query for new video segments based on descriptive keywords associated with previously selected video segments in the new audiovisual composition.

In yet another example, the system can, in response to receiving a selection of a current temporal position in the new audiovisual composition at which the user intends to insert a new video segment (i.e., an intended insertion point for a new video segment), append descriptive keywords relative to video segments adjacent to or concurrent with the current temporal position for inclusion in the textual query. Thus, the system can track an intended insertion point for a new video segment and utilize the context of this insertion point to further refine the query result.

In yet another example, the system can access a textual query including keywords for all or a subset of the aforementioned sources.

Additionally, the system can weight or change the priority of each keyword included in the textual query based on the source of the keyword in the composition creation interface. For example, the system can weight keywords extracted from a textual input by the user at a higher priority and keywords appended to the textual query via other sources at a lower priority. In another example, the system can weight keywords associated previously selected video segments based on the temporal position of the corresponding selected video segments relative to the current temporal position in the audiovisual composition selected by the user. Therefore, the system can prioritize keywords extracted from selected video segments more adjacent (i.e., with a lower adjacency value) to the current temporal position and deprioritize keywords extracted from keywords less adjacent (i.e., with a higher adjacency value) to the current temporal position.

In yet another example, the system can indicate a temporal order in the textual query indicating the underlying order to selected video segments from which keywords in the textual query have been extracted. In this example, the system can leverage the indicated order of the textual query to recommend segments that may fit an intended narrative structure of the new audiovisual composition.

The system can, in real-time, generate a query result as keywords are appendeded to the textual query via the composition creation interface of the native composition application. Upon accessing a textual query, the system can generate a query result based on the textual query, the query result including both source video segments associated with keywords in the textual query (e.g., based on the cumulative primary relevance score or a set of primary relevance scores) and target video segments (e.g., based on the cumulative secondary relevance score or a set of secondary relevance scores) in Block S110. Alternatively, the system can generate query results based on a single type of relevance score (e.g., an aggregate cumulative relevance score) and thereby generate a query result irrespective of the status of these video segments in the corpus of audiovisual compositions.

In particular, for implementations in which the segment database defines a graph database structure, the system can: identify a first keyword node representing the first associative keyword in Block S171; traverse a first edge from the first keyword node to access a source video node in Block S172; append the source video segment represented by the source video node to a query result based on the first edge in Block S173; traverse a second edge from the first keyword node to access a target video node in Block S174; and append the target video segment represented by target video node to the query result based on the second edge in Block S175. Thus, by identifying a keyword node representing a keyword in the textual query and traversing edges extending from this keyword node in the graph database, the system can identify source video segments and target video segments relevant to the keyword.

Generally, when querying a graph database implementation of the segment database, the system can traverse each edge extending from keyword nodes representing keywords in the textual query, based on the relevance score stored in association with the edge and according to any graph search algorithm. For example, the system can traverse edges based on cumulative relevance score and locate video segment nodes at the intersection of multiple edges extending from multiple keyword nodes extracted from the textual query. The system can then calculate a total relevance score based on the cumulative relevance score of each edge connecting a keyword node to the video segment node; and append the video segment represented by the video segment node to the query result based on the total relevance score. Additionally, when calculating the total relevance score, the system can weight each component cumulative relevance score based on aforementioned factors pertaining to the keyword in the textual query.

In one implementation, the system can add a user node representing a user of the native composition application creating the new audiovisual composition in the graph search for video segments to add to the query result. More specifically, the system can: identify a user node representing the user; traverse a set of user edges connecting the user node to a set of keyword nodes; identify a first set of video edges connecting the set of keyword nodes to the source video node; identify a second set of video edges connecting the set of keyword nodes to the target video node; weight the first cumulative relevance score based on the set of user edges and the first set of video edges; and weight the second cumulative relevance score based on the set of user edges and the second set of video edges. Thus, the system can leverage particular associations between keywords and the user (such as regionally or personally relevant keywords, like "swimming" for a user who engages in swimming or "Singapore" for a Singaporean user) in order to further refine video segments for inclusion in the query result.

Upon generating a query result including one or more video segments creatively relevant to a textual query, the system can, at the native composition application, render a representation of the query result in Block S180. In one implementation, the system can render a series of thumbnails representing each video segment included in the query result in the recommendation region of the composition creation interface. Alternatively, the system can render a series of preview images representing each video segment included in the query result within the recommendation region of the composition creation interface. In another example, the system can initiate playback of each video segment represented in the recommendation region in response to detecting that the user is hovering over or otherwise intending to view a particular video segment within the recommendation region.

In one implementation in which edges in the graph database indicate a temporal position of the video segment relative to the keyword (e.g., a temporal position of the source video segment of the keyword relative to a target keyword), the system can define an order of video segments included in the query results based on the temporal position indicated by each edge linking a keyword node representing a keyword in the textual query and a video segment node representing a video segment included in the query result. The system can then render a representation of the first query result according to the defined order. More specifically, the system can render a representation of the source video segment; and render a representation of the target video segment positioned relative to the representation of the source video segment based on an edge representing the temporal position of the source video segment relative to the temporal position of the target video segment.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
 accessing an audiovisual composition comprising a target video segment represented by a target video node and a source video segment represented by a source video node;
 identifying a first keyword for the source video segment based on content associated with the source video segment, the first keyword represented by a first keyword node;
 calculating a primary relevance score for the first keyword relative to the source video segment;
 updating a first edge connecting the first keyword node and the source video node based on the primary relevance score;
 in response to presence of the target video segment and the source video segment in the audiovisual composition:
  calculating a secondary relevance score for the first keyword relative to the target video segment based on:
   a temporal position of the source video segment in the audiovisual composition;
   a temporal position of the target video segment in the audiovisual composition; and the primary relevance score for the first keyword relative to the source video segment; and updating a second edge connecting the first keyword node and the target video node based on the secondary relevance score;

accessing a textual query comprising the first keyword;

in response to the textual query comprising the first keyword:

identifying the first keyword node representing the first associative keyword;

traversing the first edge from the first keyword node to access the source video node;

appending the source video segment represented by the source video node to a first query result based on the first edge;

traversing the second edge from the first keyword node to access the target video node; and appending the target video segment represented by target video node to the first query result based on the second edge; and at a native composition application, rendering a representation of the first query result.

2. The method of claim 1, wherein identifying the first keyword for the source video segment based on the content associated with the source video segment comprises:

executing a taxonomic video classification model on the source video segment to generate a classification vector associated with the source video segment; and extracting the first keyword based on a classification in the classification vector.

3. The method of claim 2, wherein calculating the primary relevance score for the first keyword relative to the source video segment comprises calculating the primary relevance score for the first descriptive keyword based on a confidence score for the classification in the classification vector.

4. The method of claim 1:

wherein accessing the audiovisual composition comprises accessing the audiovisual composition comprising:

the target video segment;

the source video segment; and audio content; and wherein identifying the first keyword for the source video segment based on the content associated with the source video segment comprises:

identifying a concurrent audio segment of the audio content to the source video segment;

executing a speech recognition model on the concurrent audio segment to generate a set of audible words; and extracting the first keyword from the set of audible words.

5. The method of claim 1, wherein identifying the first keyword for the source video segment based on the content associated with the source video segment comprises, at the native composition application, receiving a user input designating the first keyword.

6. The method of claim 1, wherein identifying the first keyword for the source video segment based on the content associated with the source video segment comprises:

at the native composition application, receiving a timestamped comment concurrent with the source video segment; and extracting the first keyword from the timestamped comment.

7. The method of claim 1, wherein calculating the secondary relevance score for the first keyword relative to the target video segment comprises:

calculating an adjacency of the source video segment to the target video segment based on the temporal position of the source video segment in the audiovisual composition and the temporal position of the target video segment in the audiovisual composition; and calculating the secondary relevance score for the first keyword based on the adjacency of the source video segment to the target video segment and the primary relevance score for the first keyword relative to the source video segment.

8. The method of claim 1, wherein accessing the textual query comprising the first keyword comprises, in response to receiving a textual input comprising the first keyword at the native composition application, appending the first keyword to the textual query.

9. The method of claim 1, wherein accessing the textual query comprising the first keyword comprises, in response to receiving a selection of a selected video segment for inclusion in a PREVIOUSLY PRESENTED audiovisual composition at the native composition application:

identifying the first keyword based on the selected video segment; and appending the first keyword to the textual query.

10. The method of claim 1, wherein accessing the textual query comprising the first keyword comprises:

in response to receiving a textual input comprising a second keyword at the native composition application, appending the second keyword to the textual query;

in response to receiving a selection of a selected video segment for inclusion in a PREVIOUSLY PRESENTED audiovisual composition at the native composition application:

identifying a third keyword based on the selected video segment; and appending the third keyword to the textual query; and wherein one of a group consisting of the second keyword and the third keyword matches the first keyword.

11. The method of claim 1:

wherein accessing the audiovisual composition comprising the target video segment and the source video segment comprises accessing the audiovisual composition comprising the target video segment and the source video segment, the target video segment associated with a first user; and further comprising:

generating a report for the target video segment comprising a set of keywords for the target video segment, the set of keywords comprising the first keyword; and serving the report to the first user.

12. The method of claim 11, wherein generating the report for the target video segment comprises:

calculating a sentiment score based on the set of keywords for the target video segment; and in response to the sentiment score exceeding a threshold sentiment score:

generating the report for the target video segment; and serving the report to the first user.

13. The method of claim 1:

wherein updating the first edge connecting the first keyword node and the source video node based on the primary relevance score comprises:

accessing a first cumulative relevance score associated with the first edge; and updating the first cumulative relevance score based on the primary relevance score;

wherein updating a second edge connecting the first keyword node and the target video node based on the secondary relevance score comprises:
  accessing a second cumulative relevance score associated with the second edge; and
  updating the second cumulative relevance score based on the secondary relevance score;
wherein traversing the first edge from the first keyword node to access the source video node comprises traversing the first edge from the first keyword node to access the source video node and the first cumulative relevance score;
wherein appending the source video segment represented by the source video node to the first query result based on the first edge comprises, in response to the first cumulative relevance score exceeding a threshold cumulative relevance score, appending the source video segment represented by the source video node to the first query result;
wherein traversing the second edge from the first keyword node comprises traversing the second edge from the first keyword node to access the target video node and the second cumulative relevance score; and
wherein appending the target video segment represented by target video node to the first query result based on the second edge comprises, in response to the second cumulative relevance score exceeding the threshold cumulative relevance score, appending the target video segment to the first query result.

14. The method of claim $1_5$:
wherein updating the first cumulative relevance score based on the primary relevance score comprises summing the first cumulative relevance score and the primary relevance score; and
wherein updating the second cumulative relevance score based on the secondary relevance score comprises summing the second cumulative relevance score and the secondary relevance score.

15. The method of claim 1:
wherein accessing the textual query comprising the first keyword comprises accessing the textual query comprising the first keyword based on input from a user at the native composition application; and
further comprising:
  identifying a user node representing the user;
  traversing a set of user edges connecting the user node to a set of keyword nodes;
  identifying a first set of video edges connecting the set of keyword nodes to the source video node;
  identifying a second set of video edges connecting the set of keyword nodes to the target video node;
  weighting the first cumulative relevance score based on the set of user edges and the first set of video edges; and
  weighting the second cumulative relevance score based on the set of user edges and the second set of video edges.

16. The method of claim 1:
wherein updating the second edge connecting the first keyword node and the target video node based on the secondary relevance score comprises updating the second edge connecting the first keyword node and the target video node based on the secondary relevance score, the second edge representing the temporal position of the source video segment relative to the temporal position of the target video segment; and wherein rendering the representation of the first query result at the native composition application comprises, at the native composition application:
  rendering a representation of the source video segment; and
  rendering a representation of the target video segment positioned relative to the representation of the source video segment based on the second edge representing the temporal position of the source video segment relative to the temporal position of the target video segment.

17. A method comprising:
accessing an audiovisual composition comprising a target video segment represented by a target video node and a source video segment represented by a source video node;
in response to presence of the target video segment and the source video segment in the audiovisual composition:
  accessing a first keyword associated with the source video segment based on a first edge connecting the source video node and a first keyword node representing the first keyword; and
  calculating a secondary relevance score for the first keyword relative to the target video segment based on:
    a temporal position of the source video segment in the audiovisual composition; and
    a temporal position of the target video segment in the audiovisual composition; and
  updating a second edge connecting the first keyword node and the target video node based on the secondary relevance score;
accessing a textual query comprising the first keyword;
generating a first query result based on the textual query and the second edge, the first query result comprising the target video segment based on the secondary relevance score; and
at a native composition application, rendering a representation of the first query result.

18. The method of claim 17:
further comprising:
  identifying the first keyword based on content associated with the source video segment;
  calculating a primary relevance score for the first keyword relative to the source video segment; and
  updating the first edge connecting the first keyword node and the source video node based on the primary relevance score;
wherein calculating the secondary relevance score for the first keyword relative to the target video segment comprises calculating the secondary relevance score for the first keyword relative to the target video segment based on:
  the temporal position of the source video segment in the audiovisual composition;
  the temporal position of the target video segment in the audiovisual composition; and
  the primary relevance score for the first keyword relative to the source video segment; and
wherein generating the first query result comprises generating the first query result based on the textual query, the first edge, and the second edge, the first query result comprising:
  the source video segment; and
  the target video segment.

19. A method comprising:
accessing an audiovisual composition comprising a target video segment represented by a target video node and a source video segment represented by a source video node;
identifying a first keyword for the source video segment based on content associated with the source video segment, the first keyword represented by a first keyword node;
calculating a primary relevance score for the first keyword relative to the source video segment;
updating a first edge connecting the first keyword node and the source video node based on the primary relevance score;
in response to presence of the target video segment and the source video segment in the audiovisual composition:
calculating a secondary relevance score for the first keyword relative to the target video segment based on:
a temporal position of the source video segment in the audiovisual composition;
a temporal position of the target video segment in the audiovisual composition; and
the primary relevance score for the first keyword relative to the source video segment; and
updating a second edge connecting the first keyword node and the target video node based on the secondary relevance score.

20. The method of claim 19, further comprising:
accessing a textual query comprising the first keyword;
in response to the textual query comprising the first keyword:
identifying the first keyword node representing the first associative keyword;
traversing the first edge from the first keyword node to access the source video node;
appending the source video segment represented by the source video node to a first query result based on the first edge;
traversing the second edge from the first keyword node to access the target video node; and
appending the target video segment represented by target video node to the first query result based on the second edge; and
at a native composition application, rendering a representation of the first query result.

* * * * *